L. Hall,
Pegging Machine,
No. 2,550, Reissued Apr. 9, 1867.
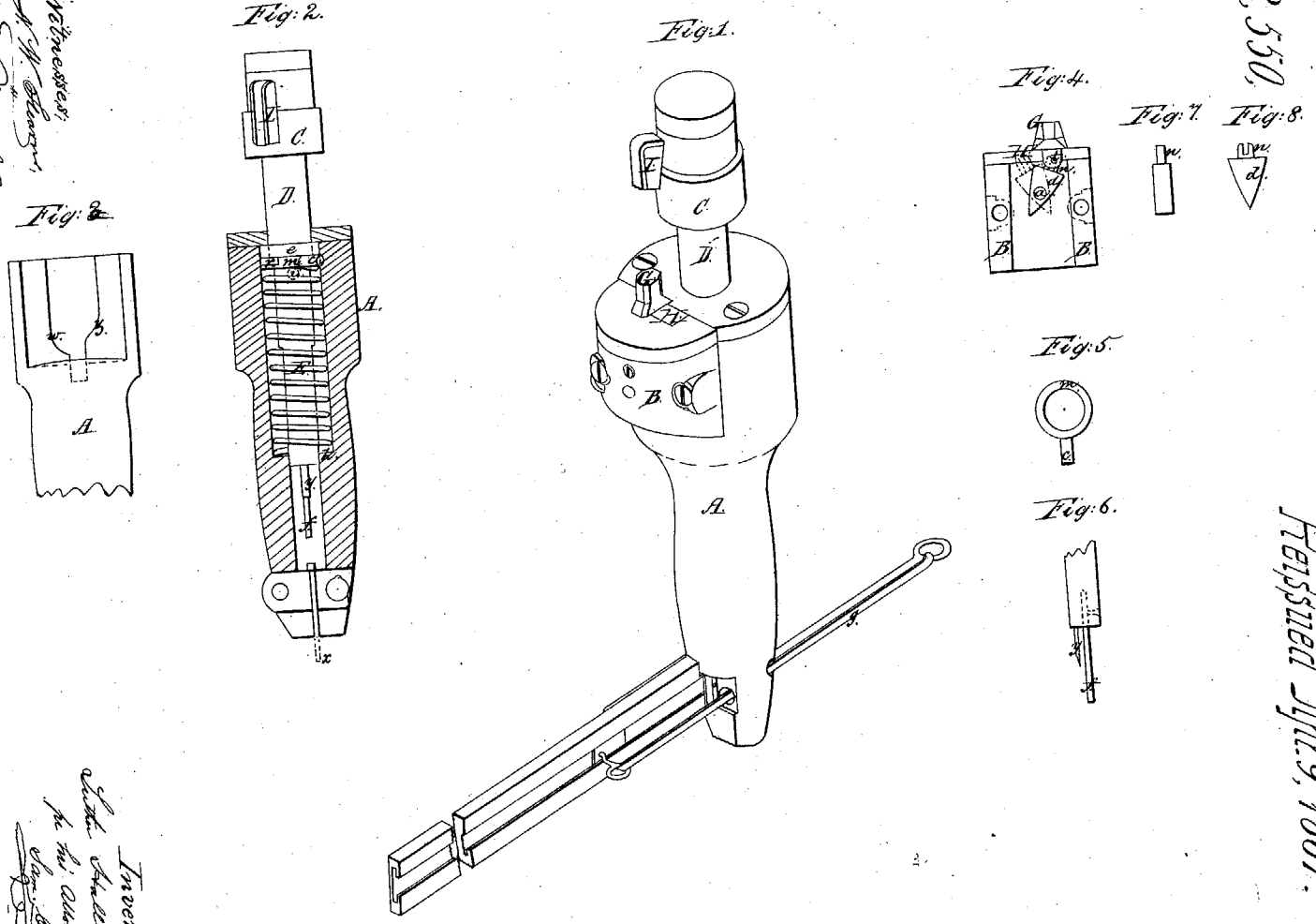
Witnesses;
N. W. Stearns,
F. E. Teschemacher,
Inventor;
Luther Hall,
per his Attorney,
Sam. Cooper
N. PETERS, PHOTO-LITHOGRAPHER, WASHINGTON, D. C.

United States Patent Office.

ALFRED B. ELY, OF NEWTON, MASSACHUSETTS, ASSIGNEE BY MESNE ASSIGNMENTS OF LUTHER HALL.

*Letters Patent No.* 41,888, *dated March* 8, 1864; *reissue No.* 2,550, *dated April* 9, 1867.

IMPROVED PEGGING MACHINE.

The Schedule referred to in these Letters Patent and making part of the same.

TO ALL WHOM IT MAY CONCERN:

Be it known that I, LUTHER HALL, of Boston, in the county of Suffolk, and the State of Massachusetts, have invented an improved Peg-Driving Machine, of which the following is a full, clear, and exact description, reference being had to the accompanying drawings, making part of this specification, in which—

Figure 1 is a view of my improved machine.

Figure 2, a vertical section through the case or body of the machine, showing the parts within in elevation.

Figure 3, a partial elevation, with the part B removed to show the inclines which operate the pin *c*.

Figure 4, a view of the part B detached, with the switch attached thereto and the sliding block G.

Figure 5, plan of the ring or yoke *m* with the pin *c*.

Figure 6, detached view of the plunger with the awl and knife.

Figures 7 and 8 represent the switch *d* detached.

My machine is particularly calculated for driving the pegs which are inserted at the time the shoe is being lasted to secure the upper leather temporarily to the inner sole and to the last. Such pegs are not driven regularly round the sole, as in ordinary peg-work, but at irregular distances from each other. On this account, in lasting boots and shoes, the pegs have always been driven by hand, as the pegging machines heretofore used would manifestly not be adapted to the purpose. In my improved machine, the descent of the plunger alternately makes a hole, and cuts off a peg and drives it, so that by striking two blows upon the plunger without moving the instrument, a hole will first be made and a peg will then be driven into it.

To enable others skilled in the art to understand my invention, I will proceed to describe the manner in which I have carried it out.

The body or case A of the pegger is of metal. The awl is extricated from the leather by the spring C, and the plunger is raised by the spring E in the ordinary manner. The awl *f* is blunt-pointed, so that it will serve, first, as an awl to make the hole, and then as driver to insert the peg. It is evident that in order that it shall serve these two ends it must, when it operates as an awl, descend lower than when it operates as a driver, for, in the former case, it must enter into and penetrate the leather, and in the latter case it must simply descend to the surface of the leather without penetrating it. To accomplish this end, a small block, G, is made to slide from one end to the other of a slot, H, each time the plunger ascends. When it is at one end of the slot, the plunger, on being struck with a hammer, descends to the end of its stroke, and the awl enters the leather, as seen at *x* in fig. 2, the knife *y*, which is connected with the plunger, and projects down from its end by the side of the awl, fig. 6, at the same time splitting off a peg, which, on the next ascent of the plunger, is projected by the India-rubber feed-spring *g* in beneath the awl and driver. The same ascent of the plunger moves the block G to the other end of the slot H, and immediately beneath the boss I, projecting from the plunger. On the next descent of the plunger, this boss strikes the block G, and the plunger is arrested at the moment when the awl reaches the surface of the leather, having driven the peg into the hole made on the previous descent of the plunger. The motion of the block G in its slot is effected every time the plunger ascends, as follows: The spring E, at its bottom end, rests upon the case at *h*, and at its upper end beneath a pin, *i*, projecting from the plunger. Above this pin is a ring or yoke, *m*, which plays freely round the plunger, upon which it is kept in place by the pin *i* beneath it, and a shoulder, *e*, above it. This ring has a projecting pin, *c*, which plays vertically in a recess in the part B, and on one side or the other of the triangular switch *d*, as the plunger moves up and down. The switch *d* is pivoted at *a*, fig. 4, to the piece B, and has a forked projection, *n*, upon its upper side, which embraces a pin, *t*, on the block G in such manner that, as the switch is vibrated upon its pivot, the block is vibrated from one end to the other of the slot. The vibration of the switch is effected as follows: Each time the piston descends the pin *c* is guided into the centre of the recess by the inclines *w* and *y*, and on again rising it is guided by the switch to one side or the other of the recess, the pin itself shifting the switch and moving the block. On the next ascent of the plunger, the pin is guided to the opposite side of the recess, and the switch is vibrated in the opposite direction. And thus the block, which follows the motion of the switch, is alternately moved to one end or the other of its slot, as required.

The operation of the pegger is as follows: The inner sole having been placed upon the last, the upper leather is drawn over it, and the instrument is placed upon the point where a peg is required. The last ascent of the plunger having left the block G upon that side of its slot where it will not interfere with the descent of the boss I, when the plunger is struck by the hammer, the awl penetrates the leather, and at the same time the knife splits off a peg from the strip of peg-wood, and the pin *c* is guided into the centre of the recess or opening in the case by one of the inclines *w* or *z* as the plunger rises; this pin being guided by the switch to the opposite side, turns the switch so as to shift the block G, and on the plunger being again struck by the hammer, the boss I strikes the block, and the awl, now acting as driver, forces the peg, which was split off by the previous descent of the plunger, into the hole just made. As the pin *c* again rises, it shifts the block from beneath the boss I, and on the instrument being moved to another place, the operation may be continued as before, each two blows of the hammer upon the plunger making a hole and driving a peg. When the awl operates as a driver, the knife does not descend low enough to split off a peg. The strip of peg-wood, during this operation, rests against the driver, and it would manifestly not answer to allow the peg-wood to feed in under the driver previous to the next descent, as it is on this descent that the awl is to make the hole. To prevent the peg-wood from being fed at this time, the upward motion of the plunger is interrupted by the pin *r*, so that the driver does not rise above the peg-wood. On the next descent of the awl to make a hole, the knife splits off a peg, and on the plunger again ascending, the pin *c* is guided to the side of the recess opposite to the pin *r*, and the driver rises sufficiently high to permit the peg cut off on the previous descent to be fed beneath it ready to be driven on the next descent of the plunger. The peg strip is fed forward by the India-rubber or other spring *g* in a well-known manner. The awl and driver may be driven by a blow of a hammer, by a cam, or by a spring.

What is claimed, and desired to be secured by Letters Patent, in pegging machines, is—

1. So constructing the awl as to use it as a peg-driver.

2. Interrupting the motion of the awl and employing it as a driver on each alternate downward stroke.

3. Interrupting the upward motion of the driver on every alternate ascent, to prevent the feeding of the peg strip, until the hole is made to receive the peg.

4. The boss I, in combination with the block G and switch *d*, or their equivalents, substantially as and for the purpose set forth.

In witness whereof I have signed the foregoing specifications and claims.

LUTHER HALL.

Witnesses:

E. T. SHAW,

O. G. GARDNER.